United States Patent Office 3,415,810
Patented Dec. 10, 1968

3,415,810
MONOAZO DYES FOR TEXTILE FIBERS
James M. Straley, John I. Dale, and Max A. Weaver, Kingsport, Tenn., assignors to Eastman Kodak Company, Rochester, N.Y., a corporation of New Jersey
No Drawing. Filed July 12, 1965, Ser. No. 471,382
14 Claims. (Cl. 260—205)

ABSTRACT OF THE DISCLOSURE

Monazo compounds prepared by diazotizing an aniline compound and coupling the resulting diazonium salt with an N-vinylsulfonylethylaniline compound are useful as dyes for hydrophobic fibers.

---

This invention relates to new water insoluble azo compounds especially useful as dyes for textile fibers, yarns and fabrics. In particular, the invention is directed to dyestuffs wherein the diazo component is preferably free of the vinylsulfonyl group.

In the dyeing and printing of textile materials such as fibers, filaments, woven and nonwoven textiles and similar articles of high molecular weight substances such as cellulose esters, polyamides, polyesters, acrylics and the like, it is of prime importance that the dyes have high color strength and good fastness, e.g. to bleaching, rubbing, drycleaning, heat, atmospheric fumes, perspiration and washing. The dyes should, especially, have good fastness to light.

The azo compounds of the invention possess such properties and have the following general formula (I) 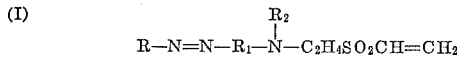
$$R-N=N-R_1-\overset{R_2}{\underset{|}{N}}-C_2H_4SO_2CH=CH_2$$

wherein

R represents a monocyclic carbocyclic group of the benzene series, preferably free of the vinylsulfonyl group, including phenyl and substituted phenyl such as lower alkylphenyl, e.g. o,m,p-toyl; lower alkoxyphenyl, e.g. o,m,p-methoxyphenyl; halophenyl, e.g. o,m,p-chlorophenyl; nitrophenyl, e.g. o,m,p-nitrophenyl; lower alkylsulfonylphenyl, e.g. o,m,p-methylsulfonylphenyl; lower alkylsulfonamidophenyl, e.g. o,m,p-methylsulfonamidophenyl; lower di(alkylsulfonyl)phenyl, e.g. 2,5-di(methylsulfonyl)phenyl; dicarboxylicacidimidophenyl, e.g. o,m-succinimidophenyl; lower fluoroalkylphenyl, e.g. trifluoromethylphenyl; lower alkanoylphenyl, e.g. m,p-acetylphenyl; lower alkanoyl amidophenyl, e.g. o,m,p-acetamidophenyl; cyanophenyl, e.g. o,m,p-cyanophenyl; carbamoylphenyl, e.g. o,m,p - carbamoylphenyl, p - phenylcarbamoylphenyl; benzamidophenyl; thiocyanophenyl, e.g. o,m,p-thiocyanophenyl; lower alkylthiophenyl, e.g. o,m,p-methylthiophenyl; phenoxyphenyl, e.g. o,m,p-phenoxyphenyl; benzylaminophenyl, e.g. o,m,p-benzylaminophenyl; N-alkylbenzaminophenyl, e.g. N-phenylmethylaminophenyl; formylphenyl, e.g. o,m,p-formylphenyl; lower carbalkoxyphenyl, e.g. o,m,p - carbethoxyphenyl; benzoylphenyl, sulfamoylphenyl, lower alkylsulfamoylphenyl, e.g. p-dimethylsulfamoylphenyl, o-ethylsulfamoylphenyl; dimethylamino; anilino; phenyl, e.g. o,m,p-benzoylphenyl;

$R_1$ represents a monocyclic carbocyclic group of the benzene series including p-phenylene and p-phenylene substituted with lower alkyl, e.g. o,m-methyl-p-phenylene; lower alkoxy, e.g. o,m-methoxy-p-phenylene; halogen, e.g. o,m-chloro-p-phenylene; lower alkylthio, e.g. o,m-methylthio-p-phenylene; lower alkanoylamido, e.g. o,m-acetamido-p-phenylene; and lower alkylsulfonamido, e.g. o,m,-methylsulfonamido-p-phenylene;

$R_2$ represents hydrogen or an alkyl radical including unsubstituted alkyl, preferably lower alkyl, i.e. from 1 to 4 carbon atoms, and substituted alkyl such as hydroxyalkyl, e.g. hydroxyethyl; polyhydroxylalkyl, e.g. glyceryl [—CH(OH)CH(OH)CH$_2$OH]; alkoxyalkyl, e.g. methoxyethyl; cyanoalkyl, e.g. cyanoethyl; cyanoalkoxyalkyl, e.g. β-cyanoethoxyethyl, acyloxyalkyl, e.g. acetoxyethyl; carboalkoxyalkyl, e.g. carbethoxyethyl; halogenoalkyl, e.g. chloroethyl; hydroxyhalogenoalkyl, e.g. β-hydroxy-γ-chloropropyl; alkylsulfonylalkyl, e.g. methylsulfonylethyl; alkyl - OCOOCH$_2$CH$_2$—, e.g. CH$_3$OCOOCH$_2$CH$_2$—; carbamoylalkyl, e.g. carbamoylethyl; alkylcarbamoylalkyl, e.g. ethylcarbamoylethyl benzyl, phenoxyalkyl, e.g. β-phenoxyethyl; cyanoalkyl, e.g. β-cyanoethyl; alkylsulfonamidoalkyl, e.g. methylsulfonamidoethyl; dicarboxamidoalkyl, e.g. β-dicarboxamidoethyl, etc. or $R_2$ represents a monocyclic carbocyclic aromatic group of the benzene series, e.g. unsubstituted phenyl and substituted phenyl such as represented by R and $R_1$ above e.g. lower alkylphenyl, lower alkoxyphenyl etc.

As can be seen from the examples below, the substituents attached to R, $R_1$ and $R_2$ serve primarily as auxochrome groups to control the color of the azo compounds.

The Heyna et al. U.S. Patent 2,784,204 granted Mar. 5, 1957 discloses azo compounds containing the vinylsulfone group, however such group in all instances is attached to the azo component of the dyestuff. Similarly, the Heyna et al. U.S. Patent 2,657,205 granted Oct. 27, 1953 claims azo compounds containing the vinylsulfone group, however such group is, in all instances, attached to the azo component of the dyestuff and, additionally, the azo component must contain a sulfonic acid group. As described above, the present azo compounds contain a vinylsulfonylethyl group which is attached to the coupling component and the diazo component is preferably free of such group. This distinctive structure imparts unexpected properties to the present azo compounds, especially when the azo compounds are used for dyeing textiles, including improved fastness to light and improved affinity for polyester fibers. Thus, the azo compounds in general can be expected to be superior to similar dyes containing the vinylsulfonyl or vinylsulfonylethyl group when tested by methods such as described in the A.A.T.T.C.C. Technical Manual, 1964 edition, depending in part upon the particular dye used and the fiber being dyed.

The azo compounds of the invention are prepared by coupling well-known diazonium salts with the vinylsulfonylethyl-containing coupling components of the invention having the formula (II) 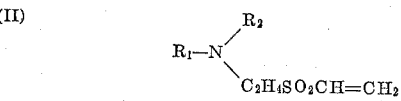
$$R_1-N\begin{matrix}R_2\\ \diagdown\\ C_2H_4SO_2CH=CH_2\end{matrix}$$

wherein $R_1$ and $R_2$ having the meaning given above.

The coupling components having the above Formula II are prepared by the following method:

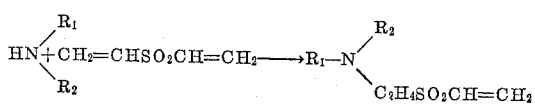
$$HN\begin{matrix}R_1\\ \diagdown\\ R_2\end{matrix}+CH_2=CHSO_2CH=CH_2\longrightarrow R_1-N\begin{matrix}R_2\\ \diagdown\\ C_2H_4SO_2CH=CH_2\end{matrix}$$

The azo compounds can be used for dyeing textile materials including synthetic polymer fibers, yarns and fabrics giving a variety of fast shades including red, orange, yellow and violet when applied thereto by conventional dye methods. The azo compounds have moderate to good affinity for cellulose ester and polyamide fibers. When the azo compounds are used for dying such hydrophobic materials, they should be free of water-solubilizing groups such as sulfo and carboxyl. In general, the dyes have good fastness, for example, to light, washing, gas (atmospheric fumes) and sublimation.

The following examples will serve to illustrate the preparation of representative intermediates and azo compounds of our invention.

EXAMPLES OF VINYLSULFONYLETHYLANILINE COUPLERS

Preparation of N-ethyl-N-β-vinylsulfonylethylaniline 23.6 g. divinylsulfone, 24.2 g. N-ethylaniline and 105 ml. toluene were refluxed for 24 hours. The toluene was removed under reduced pressure and the product distilled at 167–183° C./0.75 mm. had the structure:

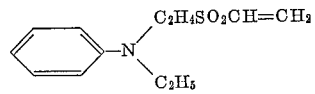

Preparation of N-ethyl-N-β-vinylsulfonylethyl-m-toluidine 27 g. of N-ethyl-m-toluidine, 23.6 g. divinylsulfone, 5 ml. acetic acid and 100 ml. toluene were mixed together and refluxed with stirring for 12 hours. The solvent was removed under reduced pressure and the product distilled under vacuum at 157–159° C./0.35 mm. The product had the structure:

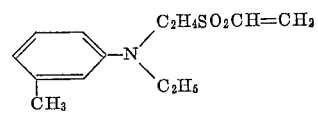

Preparation of N-hydroxyethyl-N-β-vinylsulfonyl ethylaniline

A solution of 6.75 g. β-anilinoethanol, 5 ml. acetic acid and 125 ml. toluene were added over a period of one and one-half hours to a refluxing solution of 61 g. divinylsulfone in 125 ml. toluene. The solution was stirred and heated at reflux for 4 hours and the solvent and lower boiling material were then removed under reduced pressure. Distillation of the residue on a cyclic falling film molecular still at 140–145° C. at 3–6 microns gave a product of the following structure:

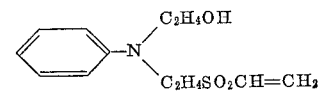

Preparation of N-vinylsulfonylethyl-o-toluidine 53.5 g. o-toluidine, 59.5 g. divinylsulfone, 200 ml. toluene, and 5 ml. acetic acid were mixed together and heated at reflux for 16 hours. The solvent and unreacted starting material were distilled under vacuum. The product distilled at 171–196° C. at 0.5/1.2 mm. Hg, and had the following structure:

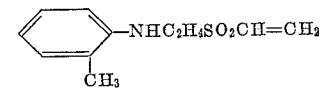

All of the couplers used were prepared by the above methods.

EXAMPLES OF THE DYES

Example 1

6.9 g. p-nitroaniline was dissolved in 12.6 ml. water containing 5.4 ml. conc. sulfuric acid. Ice was added followed by a solution of 3.6 g. sodium nitrite in 8 ml. water. The solution was stirred at 5° for one hour and then added to a chilled solution of 12.0 g. of N-ethyl-N-β-vinylsulfonylethylaniline in 100 ml. 1:5 acid (1 part propionic acid:5 parts acetic acid). The coupling solution was neutralized to brown on Congo Red paper with ammonium acetate and allowed to couple for one hour. The solution was then drowned with water, filtered, washed and dried. The product dyes polyester and cellulose acetate fibers bright orange shades with excellent light fastness and has the following structure:

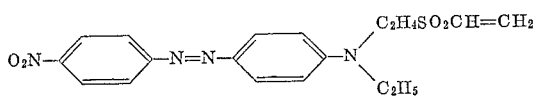

Example 2

To a solution of 3.6 g. sodium nitrite in 50 ml. conc. sulfuric acid was added 100 ml. acid 1:5 acid (1 part propionic acid:5 parts acetic acid). 6.36 g. p-chloroaniline was added to the solution followed by 100 ml. of 1:5 acid. This solution was stirred for two hours and then added to a solution of 12.7 g. of N-ethyl-N-β-vinylsulfonylethyl-m-toluidine in 100 ml. 1:5 acid, chilled to 5°. The coupling solution was neutralized to brown on Congo Red paper with ammonium aceate and allowed to couple one and one-half hours and was then filtered, washed and dried. The product dyes cellulose acetate, nylon and polyester fibers bright yellow shades and has outstanding wash fastness properties on nylon. The dye has the following structure:

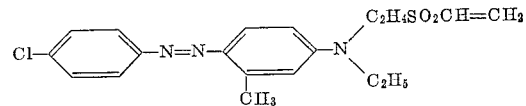

Example 3

The diazonium solution of Example 1 was added to a solution of 12.8 g. of N-hydroxyethyl-N-β-vinylsulfonylethylaniline in 100 ml. 1:5 acid. The coupling was neutralized to brown on Congo Red paper with ammonium acetate and allowed to couple one hour. The solution was then drowned with water, filtered, washed with water and dried. The product dyes cellulose acetate and nylon fibers red-orange shades of unusually good fastness properties. The dye has the following structure:

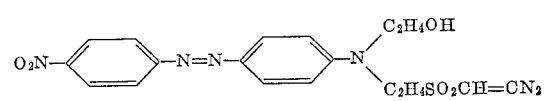

Example 4

The diazonium solution of Example 1 was added to a chilled solution of 12.0 g. of N-β-vinylsulfonylethyl-o-toluidine in 100 ml. 1:5 acid. The solution was neutralized to brown on Congo Red paper with ammonium acetate and allowed to couple one hour. The solution was then drowned in water, filtered, washed and dried. The product dyes cellulose acetate, nylon, and polyesters fast bright orange shades and has the following structural formula:

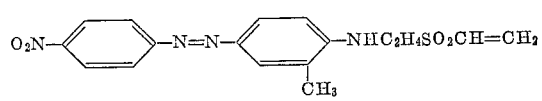

Example 5

To a solution of 3.6 g. sodium nitrite in 50 ml. conc. sulfuric acid there was added 100 ml. 1:5 acid. An amount of 12.45 g. of 2,4-bis(methylsulfonylaniline) was added followed by 100 ml. of 1:5 acid. This solution was stirred for two hours and then added to a solution of 12.7 g. of N-ethyl-N-β-vinylsulfonylethyl-m-toluidine in 100 ml. 1:5 acid. The coupling solution was neutralized to brown on Congo Red paper with ammonium acetate, allowed to couple one and one-half hours, filtered, washed with water and dried. The product dyes polyesters, polyamides, wool, modacrylics and cellulose acetate bright red shades of excellent light fastness. The dye exhibits outstanding sublimation fastness on polyester fibers and excellent wash fastness on polyamides. The product has the following structure:

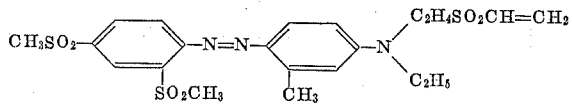

Example 6

To a solution of 3.6 g. sodium nitrite in 50 ml. conc. sulfuric acid there was added 100 ml. 1:5 acid. An amount of 10.25 g. of 2-chloro-4-methylsulfonylaniline was added followed by 100 ml. of 1:5 acid. This solution was stirred for two hours and then added to a solution of 12.7 g. of N-ethyl-N-β-vinylsulfonylethyl-m-toluidine in 100 ml. 1:5 acid. The coupling solution was neutralized to brown on Congo Red paper with ammonium acetate, allowed to couple one and one-half hours, filtered, washed with water and dried. The product dyes cellulose acetate, polyesters, nylon and wool fibers bright orange shades of good light fastness and exhibits outstanding wash fastness when dyed on nylon. The product has the following structure:

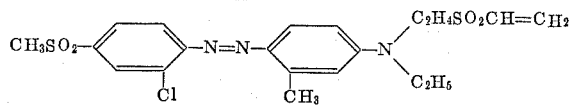

Example 7

To a solution of 3.6 g. sodium nitrite in 50 ml. conc. sulfuric acid there was added 100 ml. 1:5 acid. An amount of 6.75 g. of p-aminoacetophenone was added followed by 100 ml. of 1:5 acid. This solution was stirred for two hours and then added to a solution of 12.7 g. of N-ethyl-N-β-vinylsulfonylethyl-m-toluidine in 100 ml. 1:5 acid. The coupling solution was neutralized to brown on Congo Red paper with ammonium acetate, allowed to couple one and one-half hours, filtered, washed with water and dried. The product dyes nylon, cellulose acetate, polyesters and wool bright orange-yellow shades having good light fastness and displays excellent wash fastness when dyed on nylon. The product has the following structure:

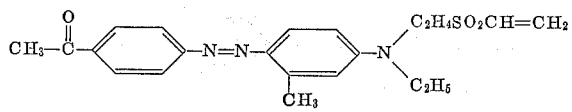

Example 8

To a solution of 3.6 g. sodium nitrite in 50 ml. conc. sulfuric acid there was added 100 ml. 1:5 acid. An amount of 8.25 g. of ethyl p-aminobenzoate was added followed by 100 ml. of 1:5 acid. This solution was stirred for two hours and then added to a solution of 12.7 g. of N-ethyl-N-β-vinylsulfonylethyl-m-toluidine in 100 ml. 1:5 acid. The coupling solution was neutralized to brown on Congo Red paper with ammonium acetate, allowed to couple one and one-half hours, filtered, washed with water and dried. The product dyes cellulose acetate, wool, modacrylics, polyesters and nylon light fast shades of bright yellow. The product exhibits excellent wash fastness when dyed on nylon and has the following structure:

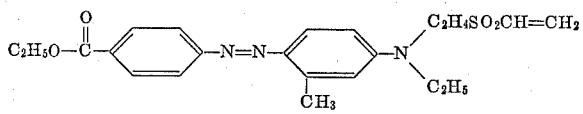

Example 9

To a solution of 3.6 g. sodium nitrite in 50 ml. conc. sulfuric acid there was added 100 ml. 1:5 acid. An amount of 6.05 g. of p-aminobenzaldehyde was added followed by 100 ml. of 1:5 acid. This solution was stirred for two hours and then added to a solution of 12.7 g. of N-ethyl-N-β-vinylsulfonylethyl-m-toluidine in 100 ml. 1:5 acid. The coupling solution was neutralized to brown on Congo Red paper with ammonium acetate, allowed to couple one and one-half hours, filtered, washed with water and dried. The product dyes cellulose acetate, polyesters, wool and nylon bright orange shades exhibiting good light fastness and excellent wash fastness on nylon. The dye obtained has the following structure:

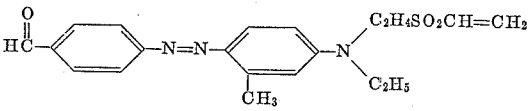

Example 10

To a solution of 3.6 g. sodium nitrite in 50 ml. conc. sulfuric acid there was added 100 ml. 1:5 acid. An amount of 8.45 g. of 4-amino-3-chloroacetophenone was added followed by 100 ml. of 1:5 acid. This solution was stirred for two hours and then added to a solution of 12.7 g. of N-ethyl-N-β-vinylsulfonylethyl-m-toluidine in 100 ml. 1:5 acid. The coupling solution was neutralized to brown on Congo Red paper with ammonium acetate, allowed to couple one and one-half hours, filtered, washed with water and dried. The product dyes cellulose acetate, nylon, polyestesr and wool bright orange shades displaying excellent light fastness and outstanding wash fastness on nylon. The dye has the following structure:

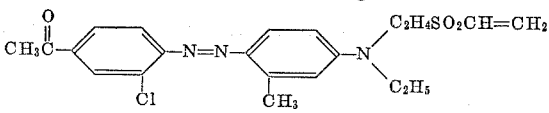

Example 11

To a solution of 3.6 g. sodium nitrite in 50 ml. conc. sulfuric acid there was added 100 ml. 1:5 acid. An amount of 8.55 g. of p-methylsulfonylaniline was added followed by 100 ml. of 1:5 acid. This solution was stirred for two hours and then added to a solution of 12.7 g. of N-ethyl-N-β-vinylsulfonylethyl-m-toluidine in 100 ml. 1:5 acid. The coupling solution was neutralized to brown on Congo Red paper with ammonium acetate, allowed to couple one and one-half hours, filtered, washed with water and dried. The product dyes nylon, cellulose actate, polyesters and wool bright yellow-orange shades of good light fastness and excellent wash fastness on nylon. The dye has the following structure:

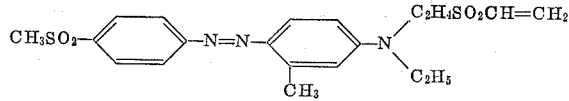

Example 12

To a solution of 3.6 g. sodium nitrate in 50 ml. conc. sulfuric acid there was added 100 ml. 1:5 acid. An amount of 6.75 g. of m-aminoacetophenone was added followed by 100 ml. of 1:5 acid. This solution was stirred for two hours and then added to a solution of 12.7 g. of N-β-vinylsulfonyl ethyl-m-toluidine in 100 ml. 1:5 acid. The coupling solution was neutralized to brown on Congo Red paper with ammonium acetate, allowed to couple one and one-half hours, filtered, washed with water and dried. The product dyes cellulose actate, nylon, polyesters, modacrylics, and wool bright, fast yellow shades exhibiting excellent wash fastness on nylon. The dye has the following structure:

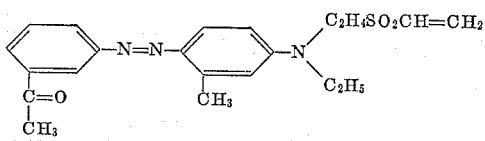

The azo compounds of the following table are made by the method illustrated by Examples 1–12. Thus, the diazotized anilines are coupled with the vinylsulfonylethylaniline couplers of Formula II above as indicated in the table.

| Example No. | Aniline Diazotized | Vinylsulfonylethylaniline Coupler | | Color Polyester Dyeing |
|---|---|---|---|---|
| | | Substituents on Radical $R_1$ | Substituents on Radical $R_2$ | |
| 13 | p-$NO_2$— | m-Tolylene | —$C_2H_5$ | Orange. |
| 14 | p-$NO_2$— | do | —$C_2H_4CN$ | Do. |
| 15 | p-$NO_2$— | do | —$CH_2CH_2Cl$ | Do. |
| 16 | p-$NO_2$— | do | —$CH_2CH_2OCH_3$ | Do. |
| 17 | p-$NO_2$— | do | —$CH_2CH_2OCOCH_3$ | Do. |
| 18 | p-$NO_2$— | do | —$CH_2CH_2N(COCH_3)_2$ | Do. |
| 19 | p-$NO_2$— | do | —$CH_2CH_2CO_2C_2H_5$ | Do. |
| 20 | p-$NO_2$— | do | —$CH_2CH_2Br$ | Do. |
| 21 | p-$NO_2$— | do | —$CH_2CH_2SO_2CH_3$ | Do. |
| 22 | p-$NO_2$— | do | —$CH_2CH_2CONH_2$ | Do. |
| 23 | p-$NO_2$— | do | —$CH_2CH_2N$(phthalimido) | Do. |
| 24 | p-$NO_2$— | do | —$CH_2CH_2OCONH$-phenyl | Do. |
| 25 | 2-$NO_2$-4-Cl— | do | —$C_2H_5$ | Red. |
| 26 | 2-$NO_2$-4-Cl— | do | —$CH_2CH_2OH$ | Scarlet. |
| 27 | 2-$NO_2$-4-Cl— | do | —$CH_2CH_2Cl$ | Do. |
| 28 | 4-$NO_2$-2-Cl— | do | —$CH_2CH_2N(COCH_3)_2$ | Do. |
| 29 | 4-$NO_2$-2-Cl— | Phenylene | —$C_2H_5$ | Do. |
| 30 | 2,6-di-Cl-4-$NO_2$— | m-Tolylene | —$C_2H_5$ | Yellow-brown. |
| 31 | 2,6-di-Cl-4-$NO_2$— | do | —$C_2H_4OH$ | Do. |
| 32 | 2-$CH_3SO_2$-4-$NO_2$— | do | —$C_2H_5$ | Red violet. |
| 33 | 2-$CH_3SO_2$-4-$NO_2$— | do | —$C_2H_4Cl$ | Do. |
| 34 | Unsubstituted | do | —$C_2H_5$ | Yellow. |
| 35 | do | Phenylene | —$CH_2CH_2OH$ | Do. |
| 36 | do | do | —$CH_2CH_2Cl$ | Orange. |
| 37 | p-$CH_3SO_2$ | m-Tolylene | —$C_2H_5$ | Do. |
| 38 | p-$CH_3SO_2$ | do | —$CH_2CH_2Cl$ | Yellow-orange. |
| 39 | p-$CH_3SO_2$ | o-Tolylene | —H | Yellow. |
| 40 | p-$CH_3CO$ | m-Tolylene | —$C_2H_5$ | Do. |
| 41 | p-Cl | do | —$CH_2CH_2OH$ | Do. |
| 42 | p-Cl | do | —$CH_2CH_2N(COCH_3)_2$ | Do. |
| 43 | p-Cl | do | —$CH_2CH_2OCONH$-phenyl | Do. |
| 44 | p-CN | do | —$C_2H_5$ | Do. |
| 45 | p-$NO_2$ | m-Chlorophenylene | —$C_2H_5$ | Do. |
| 46 | p-$NO_2$ | o-Chlorophenylene | —H | Do. |
| 47 | 2,4-di-$CH_3SO_2$ | m-Tolylene | —$C_2H_5$ | Red. |
| 48 | 2,4-di-$CH_3SO_2$ | do | —$CH_2CH_2OH$ | Red. |
| 49 | 2,4-di-$CH_3SO_2$ | do | —$CH_2CH_2OCONH$-phenyl | Red. |
| 50 | 2,4-di-$CH_3SO_2$ | do | —$CH_2CH_2N(COCH_3)_2$ | Red. |
| 51 | 2,4-di-$CH_3SO_2$ | Phenylene | —$C_2H_5$ | Red. |
| 52 | 2,4-di-$CH_3SO_2$ | o-Tolylene | —H | Orange. |
| 53 | p-$CH_3$ | m-Tolylene | —$C_2H_5$ | Yellow. |
| 54 | p-$CH_3$ | do | —$C_2H_4Cl$ | Do. |
| 55 | p-$CH_3$ | Phenylene | —$C_2H_4OH$ | Do. |
| 56 | p-$SO_2NH_2$ | do | —$C_2H_5$ | Red. |
| 57 | p-$SO_2NH_2$ | m-Tolylene | —$C_2H_5$ | Red. |
| 58 | p-$CF_3$ | do | —$C_2H_5$ | Yellow. |
| 59 | p-$NO_2$ | 2-$OCH_3$-5-Me phenylene | —$C_2H_5$ | Violet. |
| 60 | p-$NO_2$ | do | —$C_2H_4OH$ | Do. |
| 61 | p-$NO_2$ | 2-$OCH_3$-5-NHCOCH_3 phenylene | —$C_2H_5$ | Do. |
| 62 | p-$SO_2N(CH_3)_2$ | m-Tolylene | —$C_2H_5$ | Red. |
| 63 | 2,4-di-$NO_2$-6-$C_2H_5NHSO_2$— | do | —$C_2H_5$ | Violet. |
| 64 | 4-$CH_3SO_2$-2-Cl— | do | —$C_2H_5$ | Orange-yellow. |
| 65 | 4-$CH_3SO_2$-2-Cl— | do | —$CH_2CH_2OH$ | Do. |
| 66 | 4-$CH_3CO$-2-Cl— | do | —$C_2H_5$ | Do. |
| 67 | 4-CHO— | do | —$C_2H_5$ | Orange. |
| 68 | 4-CHO— | do | —$C_2H_4OH$ | Do. |
| 69 | p-(succinimido)— | do | —$C_2H_5$ | Yellow. |
| 70 | p-(succinimido)— | do | —$C_2H_4OH$ | Do. |

| Example No. | Aniline Diazotized | Vinylsulfonylethylaniline Coupler | | Color Polyester Dyeing |
|---|---|---|---|---|
| | | Substituents on Radical R₁ | Substituents on Radical R₂ | |
| 71 | p-C₂H₅OOC— | do | —C₂H₅ | Do. |
| 72 | p-H₂NOC— | do | —C₂H₅ | Do. |
| 73 | p-CH₃O— | do | —C₂H₅ | Do. |
| 74 | p-C₆H₅NHCO— | do | —C₂H₅ | Do. |
| 75 | p-NCS— | do | —C₂H₅ | Do. |
| 76 | p-CH₃S— | do | —C₂H₅ | Do. |
| 77 | p-C₆H₅O— | do | —C₂H₅ | Do. |
| 78 | p-C₆H₅— | do | —C₂H₅ | Do. |
| 79 | p(CH₃)₂N— | do | —C₂H₅ | Do. |
| 80 | p-C₆H₅NH— | do | —C₂H₅ | Do. |
| 81 | p-C₆H₅N(CH₃)— | Tolylene | —C₂H₅ | Do. |
| 82 | p-C₆H₅CO— | do | —C₂H₅ | Do. |
| 83 | p-CH₃SO₂— | do | —C₄H₉ | Orange. |
| 84 | p-CH₃SO₂— | do | —C₂H₄OCH₃ | Do. |
| 85 | p-CH₃SO₂— | do | —C₂H₄OCOCH₃ | Do. |
| 86 | p-CH₃SO₂— | do | —CH₂CHOHCH₂Cl | Do. |
| 87 | p-CH₃SO₂— | do | —CH₂CH₂N(C₂H₅)₂ | Do. |

The azo compounds of the invention may be used for dyeing hydrophobic fibers such as linear polyester, cellulose ester, acrylic, polyamide, etc., fibers in the manner described in U.S. Patents 2,880,050, 2,757,064, 2,782,187 and 2,043,827. The following examples illustrate methods by which the azo compounds of the invention can be used to dye polyester textile materials.

0.1 g. of the dye is dissolved in the dye pot by warming in 5 cc. of ethylene glycol monomethyl ether. A 2% sodium-N-methyl-N-oleyl taurate and 0.5% sodium lignin sulfonate aqueous solution is added with stirring, until a fine emulsion is obtained. Water is then slowly added to a total volume of 200 cc. 3 cc. of Dacronyx (a chlorinated benzene emulsion) are added and 10 grams of a textile fabric made of Kodel polyester fibers are entered. The fabric is worked 10 minutes without heat and then for 10 minutes at 80° C. The dye bath is then brought to the boil and held at the boil for one hour. Following this, the fabric is rinsed in warm water, then scoured in an aqueous 0.2% soap, 0.2% soda ash solution. After scouring, the fabric is rinsed with water and dried. Accordingly, since the azo compounds of the invention are water-insoluble, they can be applied from aqueous dispersions in the manner of the so-called "dispersed dyes." However, coloration can also be effected, for example, by incorporating the azo compounds into the spinning dope and spinning the fiber as usual. The azo compounds of our invention have varying utility as dyes. The degree of utility varies, for example, depending upon the material being dyed and the formula of the azo compound. Thus, for example, all the dyes will not have the same degree of utility for the same material. As mentioned above, the substituents on the R, R₁ and R₂ radicals are not critical and serve primarily as auxochrome groups to control the color of the azo compound.

Polymeric linear polyester materials of the terephthalate type are illustrative of the linear aromatic polyester textile materials that can be dyed with the new azo compounds of our invention. The terephthalate fibers sold under the trademarks "Kodel," "Dacron," and "Terylene," for example, in the form of filaments, yarn and fabric, for example, are illustrative of the polyester textile materials that can be dyed. Kodel polyester fibers are more particularly described in U.S. Patent 2,901,446. Dacron and Terylene polyester fibers are described, for example, in U.S. Patent 2,465,319. The polymeric linear polyester materials disclosed in U.S. Patents 2,945,010, 2,957,745, and 2,989,363 for example, can be dyed. The linear aromatic polyester materials specifically named have a melting point of at least 200° C.

Nylon, in fiber, yarn and fabric form, is representative of polyamides which can be dyed with the azo compounds.

The invention has been described in considerable detail with particular reference to certain preferred embodiments thereof, but it will be understood that variations and modifications can be effected within the spirit and scope of the invention as described hereinabove, and as defined in the appended claims.

What we claim is:

1. A water-insoluble azo compound having the formula $$R-N=N-R_1-\underset{\underset{R_2}{|}}{N}-C_2H_4SO_2CH=CH_2$$

wherein

R is phenyl or phenyl substituted with lower alkyl, lower alkoxy, halogen, nitro, lower alkylsulfonyl, lower alkylsulfonamido, succinimido, trifluoromethyl, lower alkanoylamido, lower alkanoyl, cyano, carbamoyl, phenyl carbamoyl benzamido, thiocyano, lower alkylthio, phenoxy, benzylamino, formyl, lower alkoxy, benzoyl, sulfamoyl, lower alkylsulfamoyl, dimethylamino, anilino, or phenyl;

R₁ is p-phenylene or p-phenylene substituted with lower alkyl, lower alkoxy, halogen, lower alkylthio, lower alkanoylamido, or lower alkylsulfonamido; and R₂ is hydrogen, a lower alkyl radical, phenyl, lower alkylphenyl, or lower alkoxyphenyl.

2. An azo compound according to claim 1 wherein R is phenyl substituted with lower alkylsulfonyl, and $R_2$ is lower alkyl.

3. The compound

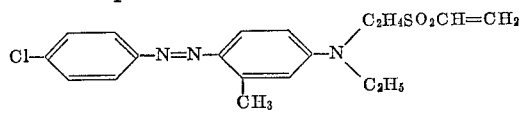

4. The compound

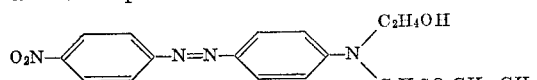

5. The compound

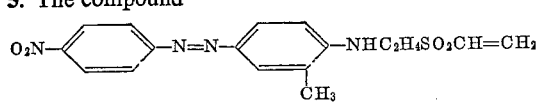

6. The compound

7. The compound

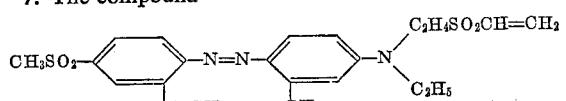

8. The compound

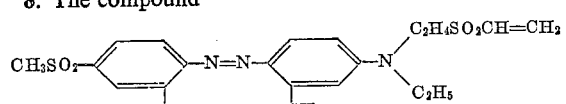

9. The compound

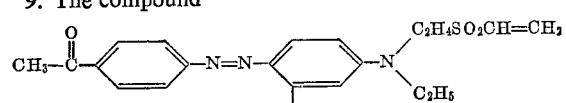

10. The compound

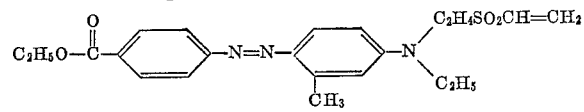

11. The compound

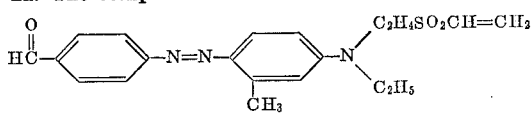

12. The compound

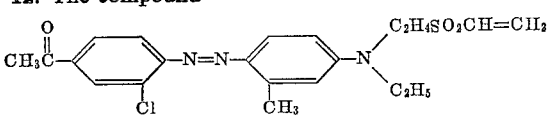

13. The compound

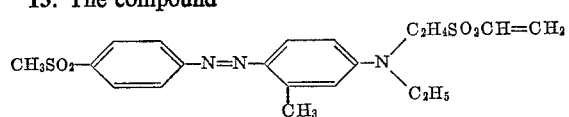

14. The compound

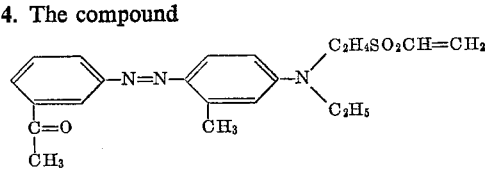

References Cited
FOREIGN PATENTS 779,781   7/1957   Great Britain.

CHARLES B. PARKER, *Primary Examiner.*
D. M. PAPUGA, *Assistant Examiner.*

U.S. Cl. X.R.

260—7.1, 37, 573, 152, 577; 8—41, 55, 54.2.